United States Patent
Zdan

(10) Patent No.: US 7,020,143 B2
(45) Date of Patent: Mar. 28, 2006

(54) SYSTEM FOR AND METHOD OF DIFFERENTIATED QUEUING IN A ROUTING SYSTEM

(75) Inventor: Michael A. Zdan, Santa Barbara, CA (US)

(73) Assignee: Ericsson Inc., Plano, TX (US)

(*) Notice: Subject to any disclaimer, the term of this patent is extended or adjusted under 35 U.S.C. 154(b) by 961 days.

(21) Appl. No.: 09/883,659

(22) Filed: Jun. 18, 2001

(65) Prior Publication Data

US 2002/0191622 A1 Dec. 19, 2002

(51) Int. Cl.
*H04L 12/56* (2006.01)
*H04L 12/26* (2006.01)
*H04L 12/28* (2006.01)

(52) U.S. Cl. ............... 370/395.21; 370/235; 370/412; 370/351; 370/395.1; 370/395.2; 370/395.4; 370/401; 370/389; 370/229; 370/230

(58) Field of Classification Search ............ 370/395.2, 370/395.21, 395.42, 389, 395.4, 401, 412, 370/235, 230, 229
See application file for complete search history.

(56) References Cited

U.S. PATENT DOCUMENTS

| | | | |
|---|---|---|---|
| 5,381,413 A | 1/1995 | Tobagi et al. | |
| 5,946,311 A | 8/1999 | Alexander, Jr. et al. | .... 370/395 |
| 6,075,791 A | 6/2000 | Chiussi et al. | ............ 370/412 |
| 6,091,709 A | 7/2000 | Harrison et al. | ............ 370/235 |
| 6,542,466 B1* | 4/2003 | Pashtan et al. | ............. 370/235 |
| 6,614,790 B1* | 9/2003 | Veres et al. | .............. 370/395.2 |
| 2003/0012144 A1* | 1/2003 | Nichols | ...................... 370/252 |
| 2003/0112756 A1* | 6/2003 | Le Gouriellec et al. | .... 370/230 |
| 2005/0068965 A1* | 3/2005 | Lin et al. | ................ 370/395.21 |
| 2005/0078602 A1* | 4/2005 | Mancour et al. | ............ 370/235 |

FOREIGN PATENT DOCUMENTS

WO    WO 00 76168 A    12/2000

OTHER PUBLICATIONS

Blake et al: "RFC 2475: An architecture for Differentiated Services" Online!Dec. 1998, IETF, INET XP002220520 Retrieved from the Internet: <URL: ftp://ftp.isi.edu/in-notes/rfc2475.txt> retrieved on Nov. 11, 2002! p. 4, line 22-line 24 p. 5, line 5-line 16 p. 6, line 21-line 25, p. 7, line 9-line 17 p. 8, line 1-line 14 p. 14, line 4-line 30 p. 15, line 11-line 40 p. 16, line 11-line 24 p. 17, line 2-line 12 p. 19, line 25-p. 20, line 18 figure 1.

* cited by examiner

*Primary Examiner*—Ricky Ngo
*Assistant Examiner*—Feben Haile

(57) ABSTRACT

The invention relates to a method for routing Internet traffic. The method generally includes the steps of receiving a packet from multimedia network, allocating a message block header for the packet, wherein the header is used to hold behavior aggregate values for internal router mapping, and queuing and routing the packet to a differentiated services network domain in a manner that ensures a specific QoS.

22 Claims, 6 Drawing Sheets

SYSTEM FOR AND METHOD OF DIFFERENTIATED QUEUING IN A ROUTING SYSTEM

FIELD OF THE INVENTION

The present invention is an improvement to conventional Internet Engineering Task Force (IETF) quality of service (QoS) protocol specification.

BACKGROUND OF THE INVENTION

In today's complex Internet environment, traffic flow data packets (packets) are processed through routing systems (routers) without regard to the type of data they represent. This approach is referred to as "Best Effort" service. However, with the advent of digitized multimedia content, including voice and other signal types, there is a growing need to process packets according to specific routing requirements associated with each data packet.

Quality of service (QoS) is the forwarding priority processing of signal types through a routing system. The aim of QoS is to provide multiple distinct classes of service where each service class matches network performance requirements of the packet. For example, voice calls require a particular QoS service class that guarantees low latency, the time required to locate the first bit or character in a storage location. Low latency ensures that packets received by a router are forwarded within a certain minimum set of time requirements. For example, if a router receives a non-voice packet and a voice packet at roughly the same time, the voice packet should be given higher priority and forwarded through the router as quickly as possible to ensure timely end-to-end delivery. There are other types of multimedia signals that are not delay sensitive, but may be bandwidth sensitive. These signal types require bandwidth guarantees throughout the network to accommodate a particular traffic type.

Certain types of traffic do not require low latency guarantees, but do require an increased amount of bandwidth to route larger amounts of signal data. Particular bandwidth guarantees must exist throughout the network to accommodate certain types of traffic, e.g., bulk data traffic. Conventional network topologies process data signals indiscriminately. That is, voice signal packets are processed with the same forwarding priority as data signal packets. This technique does not effectively evaluate and identify signals based on customer service level agreements (SLAs). The concept of Differentiated Services (DiffServ) was developed by the Internet engineering community to formalize an architecture for providing guaranteed service to aggregate service classes. Nevertheless there remains a need in the art for a way to provide hardware to efficiently implement Differentiated Services in a multimedia network routing system.

U.S. Pat. No. 6,091,709, "Quality of Service Management for Packet Switched Networks," assigned to International Business Machines Corporation (Armonk, N.Y.), describes a packet router for a data packet transmission network, the router is described as offering priority services of the type required for isochronous handling of data representing real-time voice, and includes a Quality of Service (QoS) management system for ensuring that guarantees associated with such priority service can be met with a high degree of certainty. This management system is stated to provide prioritized queues, including a highest priority queue supporting reservations for the priority service suited to isochronous handling. The highest priority queue and other queues are closely monitored by a QoS manager element for states of near congestion and critical congestion. When neither state exists, filler packet flows are promoted from lower priority queues to the highest priority queue in order to keep the latter queue optimally utilized. If all lower priority queues are empty at such times, dummy packets are inserted as filler flows. Dummy packets have a form causing routers and other stations receiving them to immediately discard them. The volume of dummy traffic allowed for each queue of the system is a predetermined fraction of the queue's estimated peak traffic load, and that volume is displaceable to allow forwarding of additional traffic through the queue when conditions require it. When a state of near congestion exists, the QoS manager demotes filler flow units from the highest priority queues to lower priority queues, in order to lessen the potential forwarding delays presented to real traffic occupying the highest priority queue. When a state of critical congestion exists in the highest priority queue, admission of new incoming traffic flows to that queue is suspended and forwarding of filler flows from that queue out to the network is also suspended.

U.S. Pat. No. 6,075,791, "System for Guaranteeing Data Transfer Rates and Delays in Packet Networks," assigned to Lucent Technologies Inc. (Murray Hill, N.J.), describes a system which services a plurality of queues associated with respective data connections. The system is described as guaranteeing data transfer rates and data transfer delays to the data connections. This is achieved by associating each connection having at least one data packet waiting in its associated queue (such a connection called a backlogged connection) with a timestamp generated as a function of system parameters including (a) the number of queues that are backlogged, (b) the data transfer rate guaranteed to each connection, (c) the sum of data transfer rates guaranteed to all backlogged connections, (d) the previous timestamp of the connection, and (e) the weighted sum of the timestamps of all backlogged connections, each timestamp weighted by the data transfer rate guaranteed to the corresponding connection. The backlogged connection associated with the timestamp having the smallest value among all of the backlogged connections is then identified and a data packet is transmitted from the queue corresponding to that connection. A new timestamp is then generated for that connection if it is still backlogged. Once the transmission of the data packet is completed, the foregoing determination of the connection with the minimum timestamp is then repeated to identify the next queue to be serviced.

U.S. Pat. No. 5,946,311, "Method for Allowing More Efficient Communication in an Environment Wherein Multiple Protocols are Utilized," assigned to International Business Machines Corporation (Armonk, N.Y.), describes a method and system that allow one or more network protocol emulators, composed of one or more network protocol emulation controllers and one or more network protocol emulation entities, which are overlaid onto the one or more base networks utilizing different communications protocols for the purpose of allowing said one or more networks to be accessed and utilized as if the one or more networks were utilizing protocols emulated by the one or more network protocol emulators. The method and system are described as using the following steps: (1) Apprising the one or more network protocol emulation controllers of network capability information inherent within protocols utilized by the one or more networks onto which the one or more network protocol emulation controllers are overlaid; (2) directing that the one or more network emulation controllers utilize the one or more network capability information of which they have been apprised to define communication capabilities for certain network protocol emulation entities within the control of the one or more network protocol emulation controllers; and (3) directing either the one or more network protocol emulation controllers or the one or more certain network protocol emulation entities within the control of the network protocol emulation controllers to utilize such defined communications capabilities to ensure that the network protocol emulation entities do not request a communications link to one or more other network protocol emulation entities that substantially exceeds the defined communication capabilities of the one or more other network protocol emulation entities.

SUMMARY OF THE INVENTION

The invention relates to a method for routing Internet traffic. The method generally includes the step of receiving a packet from multimedia network. Additionally, the method includes the step of allocating a message block header for the packet, wherein the message block header is used to hold behavior aggregate values for internal router mapping. The method further includes the step of queuing and routing the packet to a differentiated services network domain in a manner that ensures specific QoS. In one embodiment, the block header contains a default QoS 3-tuple value that reflects best effort per hop behavior treatment. Furthermore, each behavior aggregate may be a collection of packets that are treated with the same QoS. Furthermore, the QoS 3-tuple represents a QoS behavior aggregate that is based on the DifServ codepoint value of the incoming packet.

In another embodiment, the queuing step of the method for routing Internet traffic is accomplished using a queuing manager software module configured with queuing precedents. Additionally, the queuing step uses a primary set of queues corresponding to the supported behavior aggregates. Furthermore, the queuing step uses two or more prioritized egress queues. Furthermore, the egress queues include a high priority egress queue, a medium priority egress queue, and a low priority egress queue.

In another embodiment, the method for routing Internet traffic compares the DifServ codepoint field in the packet header to the DifServ codepoint to a per hop behavior table and placing a corresponding QoS 3-tuple value in the message block header message block header by the message block header marker. Furthermore, the method for routing Internet traffic further comprises presenting packets to a queuing manager from a meter or directly from a classifier, and the packets carry in the message block header information that identifies the primary queue (and indirectly the secondary queue) to which it belongs, drop precedence, and a conversation identifier. Furthermore, the queuing manager identifies the primary class queue to which the packet belongs and if the token bucket meter associated with that queue has available tokens, the packet is passed straight through to the secondary queue. If the primary queue is empty, the method comprises the step of checking to see if the secondary queue can accommodate the packet, and if the egress queue can accommodate the packet, the packet is passed through to the secondary queue, thereby permitting AF and BE traffic to consume up to full link bandwidth.

In another embodiment, the method for routing Internet traffic further comprises token bucket metering assured forwarding queues to a minimum configured rate, but allows the queues to consume unused bandwidth up to full line rate. Additionally, the method permits best effort traffic to be assigned no minimum guaranteed bandwidth but permits the traffic to contend for unused bandwidth. Furthermore, the method further assigns the QoS 3-tuple based on traffic profile using fields contained in the data packet header information. The fields contained in the data packet header information comprise a DiffServ codepoint field. If the QoS 3-tuple is different than the default message block header value, the method further comprises overwriting the default message block header with the new QoS 3-tuple based on configurable rules.

In another embodiment, as space in the egress device driver transmit ring becomes available, the method for routing Internet traffic comprises transferring packets to the egress driver based on priority queuing precedents. Additionally, the method involves the egress driver striping the message block header field from the IP packet. Moreover, the IP packet retains egress DiffServ codepoint. Furthermore, the DiffServ codepoint is optionally modified through the routing process.

The invention can also be expressed as relating to a differentiated services edge router. The differentiated services edge router is configured to receive a packet from multimedia network. Additionally, the router is configured to allocate a message block header for the packet, wherein the message block header is used to hold behavior aggregate values for internal router mapping. Furthermore, the router queues and routes the packet to a differentiated services network domain in a manner that ensures specific QoS.

In one embodiment, the differentiated services edge router comprises an ingress driver coupleable to a multimedia network and configured to allocate a message block header for an incoming packet that contains default QoS 3-tuple values which reflect best effort per hop behavior treatment. Additionally, the differentiated services edge router can be configured to employ a message block header to hold Behavior Aggregate values for internal router mapping. Moreover, the differentiated services edge router can be configured to treat network traffic having a common behavior aggregate in a manner that ensures that individual packets of such traffic receive the same QoS. Furthermore, the differentiated services edge router may include a classifier configured with a DifServ codepoint to per hop behavior table.

In another embodiment, the differentiated services edge router comprises a queuing manager software module configured with queuing precedents. Furthermore, the queuing manager identifies the primary class queue to which the packet belongs. Additionally, the differentiated services edge router comprises a primary set of queues corresponding to the supported behavior aggregates. Additionally, the differentiated services edge router is comprised of three prioritized egress queues. Moreover, if the token bucket (TB) meter associated with the primary class queue to which the packet belongs has available tokens, the packet is passed straight through to the secondary queue.

In another embodiment, the differentiated services edge router is comprised of assured forwarding queues token bucket metered to a minimum configured rate, but allowed to consume unused bandwidth up to full line rate. Furthermore, the differentiated services edge router may be configured so that best effort traffic ends up with no minimum guaranteed bandwidth, but the best effort traffic is permitted to contend for unused bandwidth. Additionally, the classifier includes a configurable database that assigns the QoS 3-tuple based on the traffic profile using fields contained in the data packet header information, including the DiffServ codepoint field. Furthermore, if the QoS 3-tuple is different than the default message block header value, the classifier may overwrite the default message block header with the new QoS 3-tuple based on configurable rules.

In yet another embodiment, the differentiated services edge router may be configured with a primary queue that, when empty, results in the queuing manager checking to see if the secondary queue can accommodate the packet. Furthermore, if the secondary queue can accommodate the packet, the packet is passed through to the secondary queue, thereby allowing AF and BE traffic to consume up to full link bandwidth. Additionally, the egress driver can be configured to strip the message block header field from the IP packet and so that the IP packet retains egress DiffServ codepoint.

DETAILED DESCRIPTION OF THE INVENTION

The invention is a system for and method of using differentiated queuing in an edge routing system to improve IETF-specified quality of service (QoS). The invention provides rate guarantees, latency guarantees and provides bandwidth sharing amongst certain classes of traffic.

Figure 1:
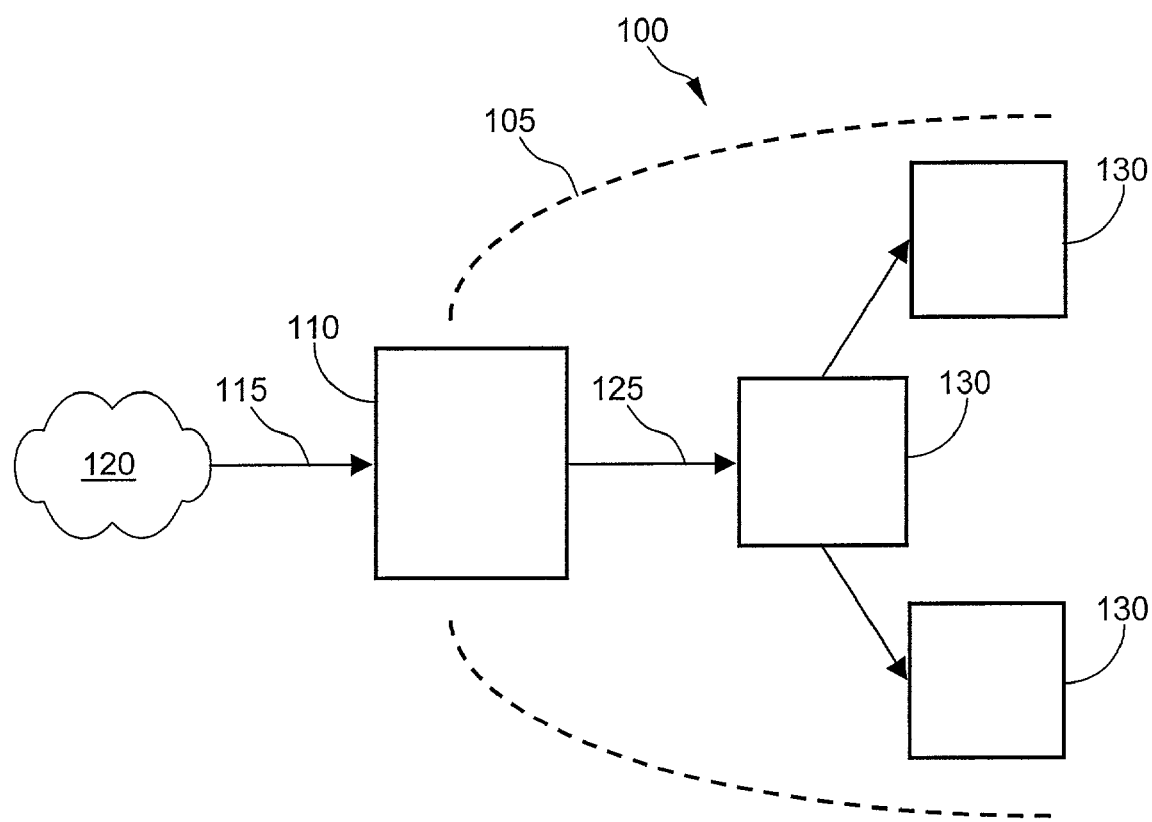
FIG. 1 shows a block diagram of a differentiated service network.

FIG. 1 shows a block diagram of a differentiated services network 100 and includes a Differentiated Services edge router 110, router ingress 115, router egress 125, the Differentiated Services (DiffServ) domain 105, a Differentiated Services network region containing DiffServ Core Routers 130. Multimedia network 120 is a non Differentiated Services multimedia network and is shown for system clarity.

Differentiated Services (DiffServ or DS) is a network topology that provides the ability to offer different kinds of network quality-of-service (QoS) to different customers and their traffic streams. The premise of DiffServ networks is that routers within the core of the network (DiffServ core routers 130) handle packets in different packet streams by forwarding them using different per-hop-behaviors (PHBs). By treating traffic flows in aggregate, DiffServ can implement Quality of Service guarantees without the need for per-flow signaling and state maintenance in each traversed node (other than the maintenance of the DSCP field in the IP header).

DiffServ domain 105 is a logical Internet region administered by a common authority. Service level agreements (SLAs) are identified by DiffServ domain 105 through contractual agreement between the DiffServ domain 105 administrative authority and the customer. Currently, the global Internet consists of hundreds of DS domains 105 administrated by different authorities. DiffServ domain 105 per hop behaviors honor the signal profile values established throughout the Internet. The currently defined standard PHB groups are Expedited Forwarding (EF), Assured Forwarding (AF), and Best Effort Forwarding (BE). Expedited Forwarding guarantees forwarding of all packets conforming to configured rate with lowest possible delay and jitter. Non-conforming packets are dropped. Assured Forwarding guarantees a minimum configured forwarding rate. Packets exceeding the configured rate may be forwarded if there are available resources (possibly with a higher drop precedence), or may be dropped. Best Effort Forwarding indicates that a packet will be forwarded if there are available resources, otherwise it may be dropped. The PHB to be applied is indicated by a DiffServ codepoint (DSCP) in the IP header of each incoming packet. At the ingress of the DiffServ network, the differentiated services edge router 110 is responsible for routing the data streams from a non-DiffServ network into the DiffServ network based on the value of the DSCP, aggregate behavior classes, and bandwidth availability. The routing process includes classification, metering, marking, dropping, and queuing.

Typically, egress bandwidth is divided up to provide rate guarantees according to code point valued signals. For example, if the code point field value is equivalent to expedited forwarding, then the signal is guaranteed to have 10% of the available bandwidth, while a code point field value of mapping to assured forwarding is guaranteed 60% of the available bandwidth. In this way, the differentiated services edge router 110 provides availability guarantees for packets marked in a specific way. Egress bandwidth (e.g., 10 Mbps for standard Ethernet) is configured to provide bandwidth reservation for particular traffic flows. Data packets are marked with particular code point forwarding behavior and behavior aggregate codes. Egress bandwidth is divided up to provide specific signal classes with greater bandwidth.

Figure 2:
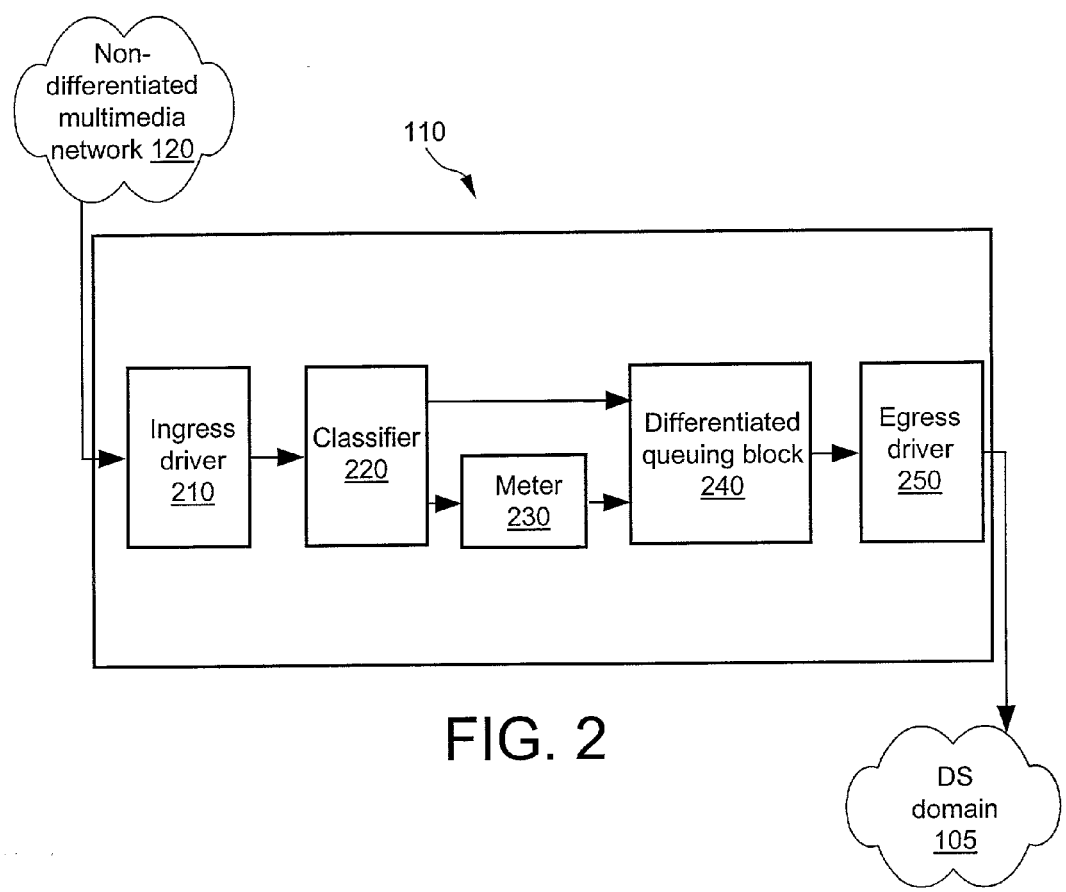
FIG. 2 shows a detailed block diagram of a differentiated services edge router.

FIG. 2 shows a detailed block diagram of differentiated services edge router 110 and includes an ingress driver 210, a classifier 220, a meter 230, a differentiated queuing block 240, and an egress driver 250.

Ingress driver 210 receives packets from multimedia network 120 and allocates a message block header for the packet that contains default QoS 3-tuple values which reflect Best Effort (BE) Per Hop Behavior (PHB) treatment. The message block header (MBLK) is used to hold Behavior Aggregate values for internal router mapping. A behavior aggregate is a collection of packets that are treated with the same Quality of Service.

Classifier 220 is a multi-field classifier software module configured with a DifServ codepoint (DSCP) to PHB table and a group of specialized algorithmic filters used to select packets based on the content of a configurable number of header fields. Classifier 220 is further described in FIG. 3.

Meter 230 is an event-based (as opposed to time-based), single-rate, token bucket meter configured to perform an action on a packet based on whether the packet is found to be in-profile or out-of-profile. The configured actions can be one of MARK, DROP or NONE. Meter 230 is further described in FIG. 4 below.

Queuing block 240 generally includes a queuing manager software module configured with queuing precedents, a primary set of queues corresponding to the supported behavior aggregates, and the three prioritized egress queues. Queuing block 240 is further described in FIG. 5 below.

Egress driver 250 provides connection to the differentiated services network and monitors and manages the transmit ring. The egress driver 250 may consist of any of a number of standard implementations.

Figure 3:
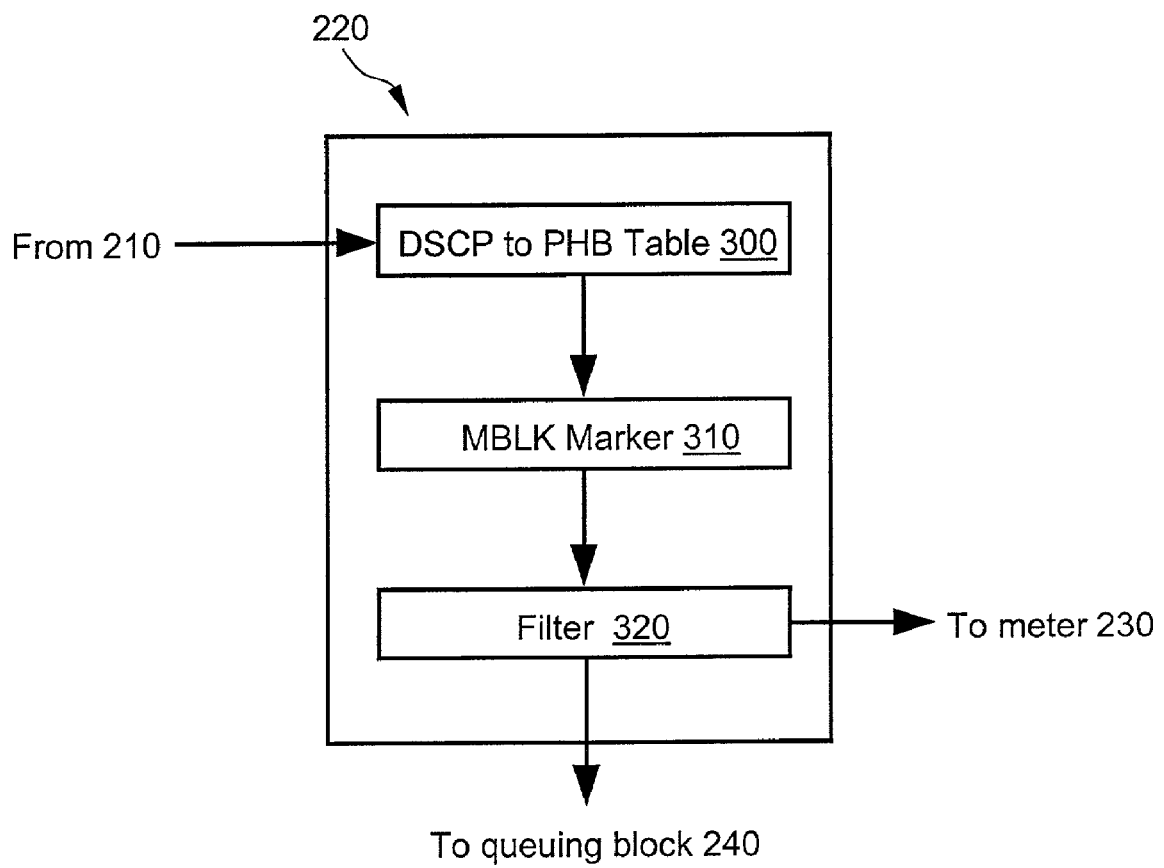
FIG. 3 shows a block diagram of a classifier internal configuration.

FIG. 3 shows a block diagram of the internal configuration of classifier 220. Classifier 220 generally includes a DSCP to PHB table 300, an MBLK marker 310, and one or more IP filters 320. For clarity, only one IP filter is shown in FIG. 3.

The packet is sent to the classifier 220 from the ingress driver 210. The classifier 220 compares the DSCP field in the packet header to the DSCP to PHB table 300 and the corresponding QoS 3-tuple value is placed in the MBLK message block header by the MBLK marker 310. The QoS 3-tuple represents a Quality of Service behavior aggregate that is based on the DSCP value of the incoming packet. As an IP packet traverses the system, the values in the MBLK header are used to make handling decisions.

The packet is then passed through one or more filters 320. Filter 320 is an algorithm that is configured as either Behavior Aggregate (BA) or Multi-Field (MF) filter. BA filters only look at the DSCP field in the IP header. MF filters look at a configurable combination of IP header elements (same fields as existing IP filters, plus the DSCP field). The filter compares one or more IP header elements to a set of configurable traffic conditioning rules. If the packet matches a filter and a meter 230 has been assigned it is sent to the corresponding meter 230. If the packet does not match a filter or the filter does not have a corresponding meter, it is forwarded directly to the differentiated queuing block 240.

Figure 4:
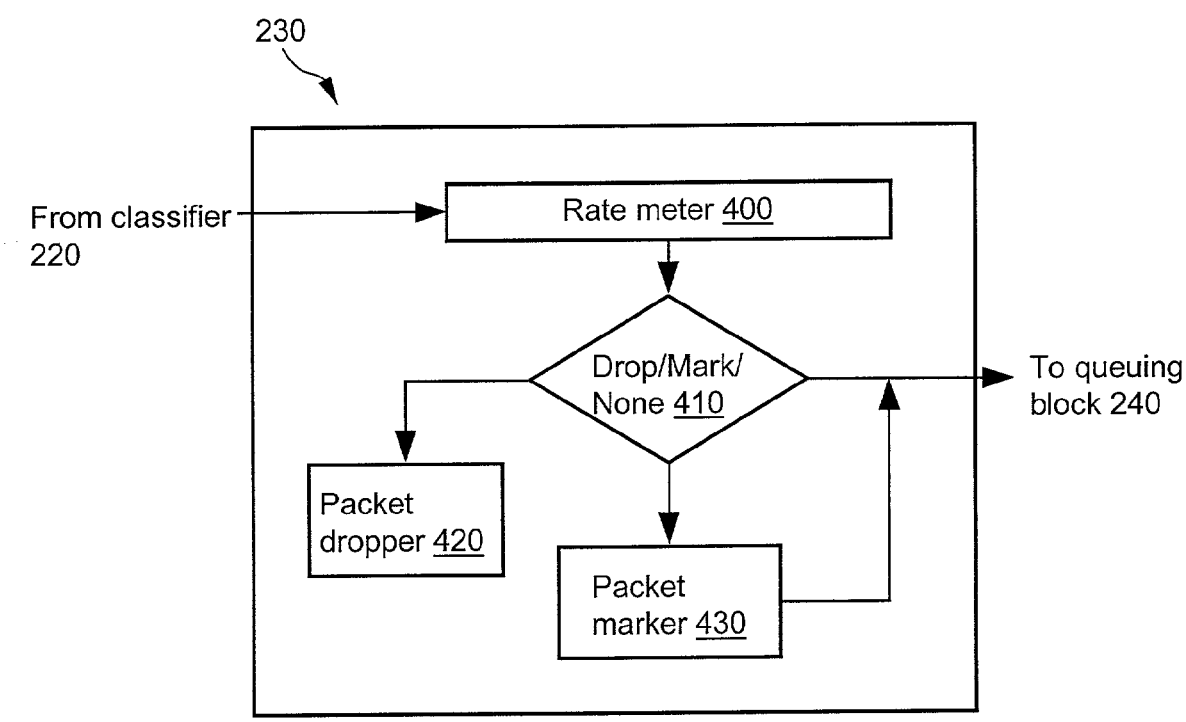
FIG. 4 shows a block diagram of the meter internal configuration

FIG. 4 shows a block diagram of meter 230. Meter 230 generally includes a rate meter 400, a Drop/Mark/None decision block 410, a packet dropper 420, and a packet marker 430. When a packet matches a filter 320, it may be passed to a corresponding meter 230. When packets enter the meter, they are examined by the rate meter 400 to determine if the temporal properties of the data stream are within the rate profile defined for the packets' behavior aggregate. This process is used to ensure the client-user is not exceeding the packet profile determined by the behavior aggregate. The rate meter communicates to the Drop/Mark/None decision block 410 whether the packets are in-profile or out-of-profile. The Drop/Mark/None decision block 410 is configured to examine the rate meter 400 result, the QoS 3-tuple and traffic capacity.

If the meter determines that the DS domain 105 contains available capacity, it will attempt to admit "out-of-profile" data packets. If no resources are available, it will drop out-of-profile packets. This process is used to ensure the client-user is not exceeding the packet profile determined by the SLA.

Figure 5:
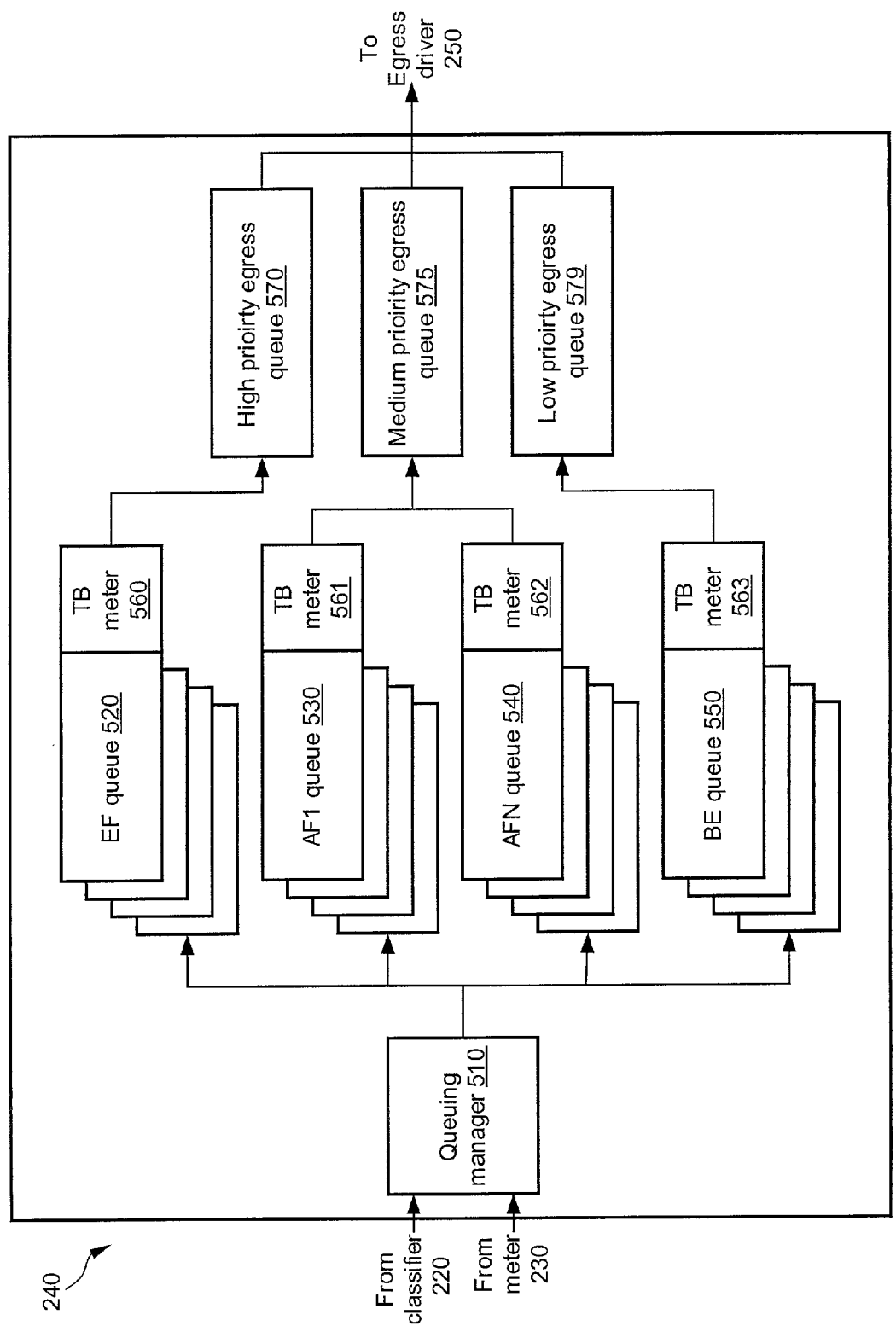
FIG. 5 shows a block diagram of a differentiated queuing block.

FIG. 5 shows a block diagram of the differentiated queuing block 240. Differentiated queuing block 240 generally includes a queuing manager 510, an expedited forwarding queue EF queue 520 with associated token bucket meter TB meter 560, assured forwarding queues AF queue 530 and AFN queue 540 with their associated token bucket meters TB meter 561 and TB meter 562, a best effort queue BE queue 550 with associated token bucket meter TB meter 563, and three egress queues, high priority egress queue 570, medium priority egress queue 575, and low priority egress queue 579.

Packets are presented to the queuing manager 510 from either the meter 230 or directly from the classifier 220. Arriving packets will carry in the MBLK information that identifies the primary queue (and indirectly the secondary queue) to which it belongs, drop precedence and a conversation identifier.

The queuing manager 510 identifies the primary class queue to which the packet belongs to and if the token bucket (TB) meter associated with that queue has available tokens, the packet is passed straight through to the secondary queue (and possibly straight through to the device driver). The current token count is adjusted based on the number of bytes in the packet. TB token counters are allowed to go negative (borrow from future tokens). If, at the time the queuing manager 510 receives a packet, the token count is negative and the packet is marked for expedited forwarding, the packet will be dropped. Expedited forwarding traffic cannot exceed a maximum rate. Otherwise the queuing manager 510 checks to see if the primary queue is empty. If not empty, the packet is conversation queued. If the queue is empty, queuing manager 510 checks to see if the secondary queue can accommodate this packet. If it can the queuing manager 510 directs the packet through to the secondary queue (this allows AF and BE traffic to consume up to full link bandwidth). If it cannot, queuing manager 510 begins queuing in the primary queue.

EF queue 520 controls all traffic having low latency requirements. The system includes multiple AF queues, AF1 530 through AFN 540. In the preferred embodiment, the system includes four AF queues implementing three different drop precedents, (AF1-1, or a higher drop AF1-2 or AF1-3). The BE queue 550 controls all unmarked traffic. EF, AF, and BE queues are considered primary queues and are "fair" queues in the present invention. A fair queue is a queue having multiple FIFO queues configured in parallel.

In the preferred embodiment, there are six primary queues: an expedited forwarding queue, four assured forwarding queues, and a best effort queue. The expedited forwarding queue (EF queue) 520 is token bucket metered by TB meter 560 to a maximum configured rate. The assured forwarding queues (represented by AF1 queue 530 and AFN queue 540) are also token bucket metered (by TB Meter 561 and TB Meter 562) to a minimum configured rate but allowed to consume unused bandwidth up to full line rate. The best effort queue BE queue 550 is token bucket metered by TB Meter 563 to the rate which is calculated by subtracting the sum of the EF and AF configured rates from the total link bandwidth. Configured rates must not total more than the maximum link rate. Best effort traffic may end up with no minimum guaranteed bandwidth, but it can still contend for unused bandwidth.

The secondary queue generally includes three priority based FIFO queues: high priority egress queue 570, medium priority egress queue 575, and low priority egress queue 579.

High priority egress queue 570 is a FIFO queue that transmits data packets received from a forwarding queue as directed by the queuing manager 510 to a device driver transmit ring egress driver 250. If the device driver transmit ring, through software logic, is recognized as full, data packets are queued into the high priority egress queue 570. Data packets propagating through the HP queue 310 are typically EF queue 520 data packets.

Medium priority egress queue 575 is a FIFO queue that transmits data packets received from a forwarding queue as directed by the queuing manager 510 to a device driver transmit ring egress driver 250. If the device driver transmit ring, through software logic, is recognized as full, data packets are queued into the medium priority egress queue 575. Data packets propagating through the MP queue are typically from one of the assured forwarding queues (e.g. AF1 queue 530) data packets.

Low priority egress queue 579 is a FIFO queue that transmits data packets derived from a forwarding queue as directed by the queuing manager 510 onto a device driver transmit ring egress driver 250. If the device driver transmit ring, through software logic, is recognized as full, data packets are queued into the low priority egress queue 579. Data packets propagating through the LP queue are typically BE queue 550 data packets.

Figure 6:
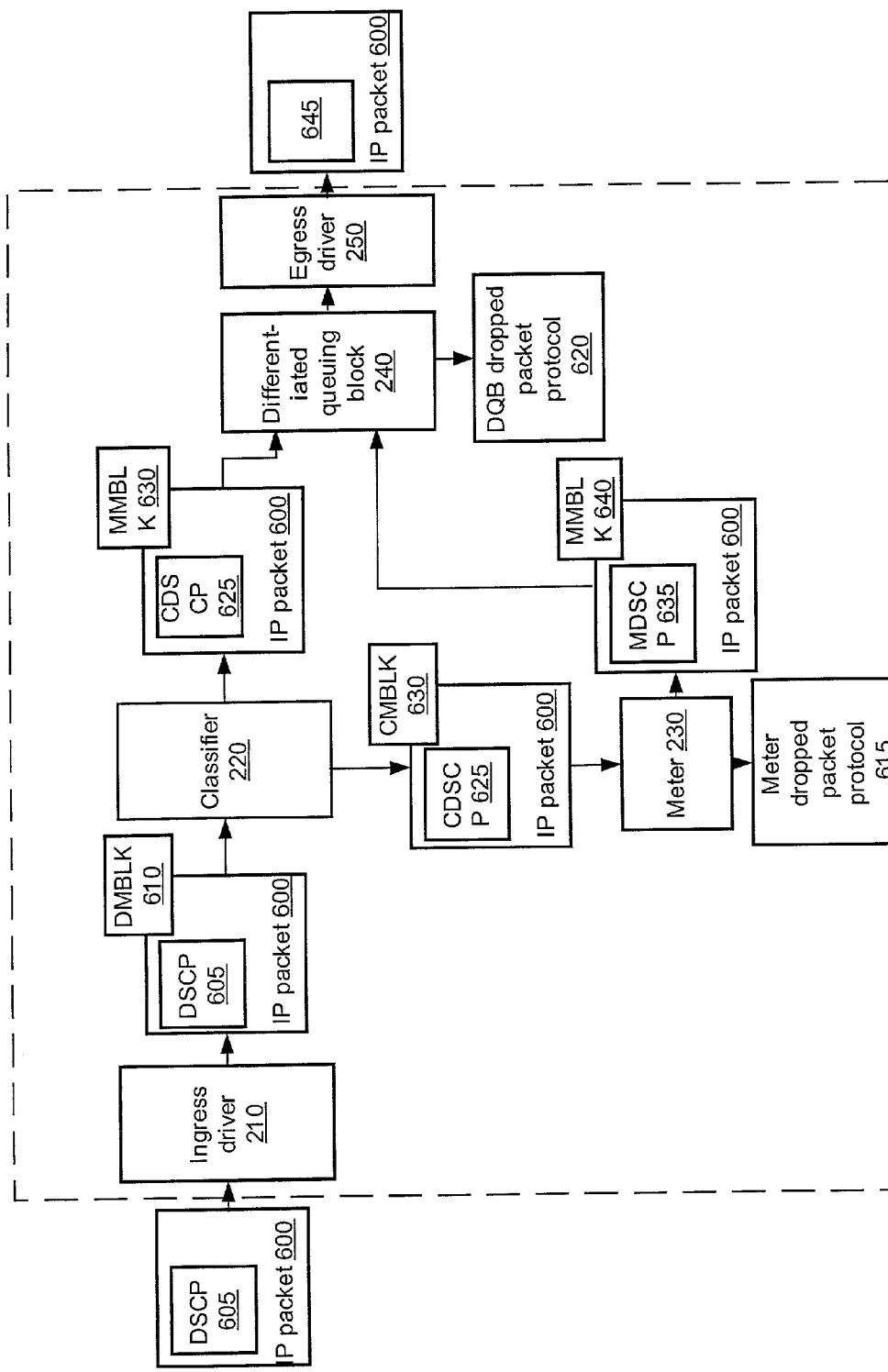
FIG. 6 shows IP packet flow in a differentiated services edge router.

FIG. 6 illustrates the IP packet flow through differentiated services edge router 110. In operation, IP packet signal traffic is processed through ingress driver 210 which associates a default MBLK data descriptor DMBLK 610 with the IP packet 600. IP packet 600 then propagates to a point incident with the classifier 220. The classifier 220 includes a configurable database that assigns the QoS 3-tuple based on the traffic profile using fields contained in the data packet header information, including the DiffServ codepoint DSCP 605 field. If the QoS 3-tuple is different than the default MBLK value, the classifier 220 may overwrite the default MBLK DMBLK 610 with the new QoS 3-tuple based on configurable rules. The resulting classifier-processed MBLK is CMBLK 630.

The system passes IP packet 600 with processed MBLK field through a series of filters. If IP packet 600 matches a filter, it is sent to the corresponding meter. If an IP packet 600 does not match any filters resident in classifier 220, it is sent directly to the differentiated queuing block 240. If the system sends the IP packet to meter 230, the system examines the packet to see if the temporal properties of the aggregate flow to which IP packet 600 belongs is in-profile or out-of-profile.

Meter 230 interrogates the DS domain 105 available capacity and uses a configurable set of rules to determine if IP packet 600 disposition should be DROP, MARK or NONE. If the decision is to DROP the packet, the system forwards IP packet 600 to meter dropped packet protocol 615. If the decision is to MARK the packet, the system updates MBLK and/or the DSCP fields and forwards the packet to differentiated queuing block 240. The resulting meter-processed fields are MDSCP 635 and MMBLK 640. If the decision is NONE, the packet is sent unmodified to differentiated queuing block 240.

Differentiated queuing block 240 receives IP packet 600, examines the MBLK field and places the packet in the appropriate queue. If the IP packet is identified as EF and the EF token bucket meter TB meter 560 reads negative, the packet is dropped. EF traffic cannot exceed a maximum pre-determined rate. If the packet is dropped, IP packet 600 is forwarded to DQB dropped packet protocol 620. If IP packet 600 is not dropped, queuing manager 510 checks to see if the associated primary queue is empty. If not empty, the packet is conversation queued. If the primary queue is empty, the queuing manager 510 checks to see if the secondary queue can accommodate the packet. If the secondary queue can accommodate the packet, the packet is passed through to the secondary queue. This arrangement allows AF and BE traffic to consume up to full link bandwidth. If the secondary queue cannot accommodate the packet, the queuing manager 510 begins queuing in the primary queue.

As space in the egress device driver transmit ring becomes available, packets are transferred to egress driver 250 based on priority queuing precedents. Egress driver 250 strips The MBLK field from the IP packet 600. The IP packet 600 retains egress DiffServ codepoint EDSCP 645. The DiffServ codepoint may or may not have been modified through the routing process.

The many features and advantages of the invention are apparent from the detailed specification. Numerous modifications and changes will readily occur to those of ordinary skill in the art; consequently, the invention is not limited to the embodiments described herein. All suitable modifications and equivalents should be considered as falling within the spirit and scope of the invention.

The invention claimed is:

1. A method of routing packets within a communication system, comprising the steps of:
   receiving a packet from a communications network;
   allocating a message block header within said received packet;
   associating a predefined default value for said message block header;
   identifying a quality-of-service value associated with said received packet wherein packets identified with particular one of said quality-of-service value is guaranteed a predefined bandwidth within said communication system;
   metering the received packet to determine whether resources are available to properly route the packet while complying with a service level agreement associated with said classified qualify-of-service;
   in response to a determination that said packet cannot be routed in compliance with said service level agreement, dropping said packet; otherwise, routing said packet.

2. The method of claim 1 further comprising the steps of:
   determining whether said identified quality-of-service value is different than said associated predefined default value for said message block header; and
   in response to said determination, overwriting said message block header with said identified quality-of-service value.

3. The method of claim 1 wherein said step of routing said packet further comprises the steps of:
   determining whether an outgoing device driver is available for said quality-of-service value; and
   in response to a determination that said outgoing device driver is unavailable, queuing said packet within one of a plurality of primary queues associated with said identified quality-of-service value.

4. The method of claim 3 wherein said step of queuing said packet further comprises the steps of:
   assigning a predefined threshold value with each of said plurality of primary queues;
   monitoring each of said plurality of primary queues to determine whether the capacity level associated with said queue exceeds said predefined threshold value; and
   queuing any additional packets, in response to said determination, to one of a plurality of secondary queues associated with said identified quality-of-service value.

5. The method of claim 4 wherein certain of said plurality of secondary queues are assigned to one of said plurality of primary queues.

6. The method of claim 5 wherein one of said plurality of secondary queues is an expedited forwarding queue, further comprising the steps of queuing said packet identified as expedited forwarding value within said expedited forwarding queue.

7. The method of claim 3 wherein said plurality of primary queues comprises of:
   a high priority egress queue;
   a medium priority egress queue; and
   a low priority egress queue.

8. A packet router within a packet communication network for providing differentiated services based on a service level agreement associated with a plurality of incoming packets to be processed and routed within said packet router, comprising:
   a ingress driver for receiving said plurality of incoming packets;

a classifier coupled to said ingress driver for classifying each of said plurality of packets with a particular behavior aggregate value wherein said behavior aggregate value is indicative of the internal routing treatment to be provided by said packet router for said each packet;

a meter coupled to said classifier for evaluating some of said plurality of packets and discarding certain ones of said packets wherein the service level agreement associated with said behavior aggregate value cannot be guaranteed;

a differentiated queuing block coupled to said meter and said classifier for handling said plurality of packets; and a egress driver coupled to said differentiated queuing block for transmitting some of said plurality of packets over said packet communications network.

9. The packet router of claim 8 wherein said ingress driver further comprises means for allocating a message block header for each of said packets for storing said behavior aggregate value.

10. The packet router of claim 9 wherein said egress driver comprises means for stripping said message block header within each of said packets before transmitting each of said packet over said communications network.

11. The packet router of claim 9 wherein said classifier further comprises a table for mapping a differentiated services code point (DSCP) stored within each of said packets to an associated behavior aggregate value and means for storing said behavior aggregate value within said message block header.

12. The packet router of claim 8 wherein said classifier further comprises a filter for determining whether particular ones of said plurality of packets need to be evaluated by said meter and forwarding such determined packets to said meter.

13. The packet router of claim 8 wherein said differentiated queuing block further comprises a plurality of primary queues for queuing some of said packets when resources within said egress driver are not available.

14. The packet router of claim 13 wherein some of said packets are classified as expedited forwarding, assured forwarding or best efforts forwarding and wherein said plurality of primary queues further comprises:

a high priority egress queue for queuing packets that are classified expedited forwarding;

a medium priority egress queue for queuing packets that are classified assured forwarding; and a low priority egress queue for queuing packets that are classified best effort forwarding.

15. The packet router of claim 14 wherein said differentiated queuing block further comprises a plurality of secondary queues for queuing some of said packets when certain one of said primary queues exceeds a predefined threshold content value.

16. The packet router of claim 15 wherein said plurality of secondary queues further comprises:

an expedite forwarding queue for queuing packets that are classified expedited forwarding;

an assured forwarding queue for queuing packets that are classified assured forwarding; and a best effort queue for queuing packets that are classified best efforts forwarding.

17. The packet router of claim 16 wherein each of said secondary queues further comprises a token bucket meter for keeping track of the bandwidth rate available for said associated behavior aggregate value.

18. An apparatus for providing differentiated service routing within a packet communication system, comprising the steps of:

means for receiving a packet from a communications network;

means for allocating a message block header within each of said received packet;

means for assigning behavior aggregate value for each of said received packets;

means for metering some of said received packets to determine whether resources are available to properly route said packets while complying with a service level agreement associated with said behavior aggregate value;

in response to a determination that a particular packet cannot be routed in compliance with said service level agreement, means for dropping said packet; otherwise, means for routing said packet; and wherein said means for routing said packet further comprises:

a plurality of primary queues;

means for determining whether an outgoing device driver is available; and in response to a determination that said outgoing device driver is unavailable, means for queuing said packet within one of said plurality of primary queues.

19. The apparatus of claim 18 wherein said means for queuing further comprises:

a plurality of secondary queues;

means for assigning a predefined threshold value with each of said plurality of primary queues;

means for monitoring each of said plurality of primary queues to determine whether the capacity level associated with said queue exceeds said predefined threshold value; and means for queuing any additional packets, in response to said determination, to one of said plurality of secondary queues.

20. The apparatus of claim 19 wherein certain of said plurality of secondary queues are assigned to particular one of said plurality of primary queues.

21. The apparatus of claim 19 wherein said plurality of secondary queues comprises:

an expedited forwarding queue;

an assured forwarding queue; and a best effort queue.

22. The apparatus of claim 18 wherein said plurality of primary queues further comprises:

a high priority egress queue;

a medium priority egress queue; and a low priority egress queue.

* * * * *